United States Patent [19]

Krackeler et al.

[11] 3,860,676
[45] Jan. 14, 1975

[54] FLAME RETARDANT COMPOSITIONS

[75] Inventors: Joseph J. Krackeler, Los Altos Hills; Michael C. DeClerck, Mountain View, both of Calif.

[73] Assignee: National Distillers and Chemical Corporation, New York, N.Y.

[22] Filed: May 23, 1973

[21] Appl. No.: 363,217

[52] U.S. Cl. ... 260/897 B, 260/45.75 B, 260/45.8 A
[51] Int. Cl. ............................................. C08f 45/58
[58] Field of Search ..... 260/45.75 B, 45.8 A, 897 B

[56] References Cited
UNITED STATES PATENTS

| | | | |
|---|---|---|---|
| 2,610,920 | 9/1952 | Hopkinson | 260/45.75 |
| 2,625,521 | 1/1953 | Fischer et al. | 260/45.75 |
| 3,422,055 | 1/1969 | Maloney | 260/897 |
| 3,531,455 | 9/1970 | Straub | 260/94.9 |
| 3,574,659 | 4/1971 | Kwart et al. | 260/2.5 |
| 3,632,544 | 1/1972 | Boyer | 260/45.8 |
| 3,639,299 | 2/1972 | MacDowell | 260/45.75 |
| 3,639,529 | 2/1972 | MacKenzie | 260/94.9 |

*Primary Examiner*—V. P. Hoke
*Attorney, Agent, or Firm*—Allen A. Meyer, Jr.

[57] ABSTRACT

Improved flame retardant compositions formed by blending low density polyethylene and ethylene-vinyl acetate copolymer with a halogen-containing fire retardant additive, an antimony compound, an acid acceptor, and a cross-linking agent. Conventional additives such as antioxidants and stabilizers may also be present. Such compositions are useful as insulation coatings for electrical wire or cable.

11 Claims, No Drawings

FLAME RETARDANT COMPOSITIONS

The present invention relates to improved flame retardant polyethylene compositions that are useful in coating electrical wire or cable. Most particularly the invention pertains to polymer-based flame retardant compositions comprising low density polyethylene, ethylene-vinyl acetate copolymer, a halogen-containing fire retardant, an antimony compound, an acid acceptor and a cross-linking agent.

In accordance with the present invention it was found that the use of a particular polymer system containing certain additives results in the formation of a flame retardant polymeric composition that, when used as a primary insulating coating on wire or cable, enables the finished product to pass flammability requirements such as the IPCEA vertical test.

The polymeric component is a combination of low density polyethylene and ethylene-vinyl acetate copolymer. In general, the amount of the polymeric component will range from about 50 to 75 percent by weight based on the total weight of the flame retardant polymeric composition. Although the relative amounts of the low density polyethylene and ethylene-vinyl acetate copolymer employed in the formulation may vary widely, i.e., at least 20 percent by weight of the ethylene-vinyl acetate copolymer, based on the total weight of the polymeric component; the low density polyethylene and ethylene-vinyl acetate copolymer may be utilized in approximately equal amounts. For some purposes it may be advantageous to employ an ethylene-ethyl acrylate copolymer in place of the ethylene-vinyl acetate copolymer.

The presence of both low density polyethylene and ethylene-vinyl acetate copolymer in the formulation is necessary in order for the wire coating to have the desired flammability characteristics. Furthermore, replacement of the ethylene-vinyl acetate copolymer with other polymer systems such as polyolefin homopolymers results in a reduction in flame resistance.

The suitable low density polyethylene will have a density within the range of 0.915 to 0.935 grams/cc. Low density polyethylene (0.92 gm/cc) may be produced, for example, by the polymerization of ethylene at a pressure greater than 1,200 atmospheres and at a temperature of 100° to 300°C. Lower pressures of about 500 atmospheres can be used if a catalyst such as oxygen or benzoyl peroxide is added to the ethylene as described by Fawcett et al., Chemical Abstracts, 32,1,362 (1,938). Such a low density polyethylene is sold under the tradename DYNH by Union Carbide Corporation and has a melt index of 2.0 grams/10 minutes and a 0.92 gm/cc density.

The ethylene-vinyl acetate copolymer will have a density within the range of from about 0.92 to 0.95 gm/cc. An ethylene-vinyl acetate copolymer having a melt index of 2.5 and a density of 0.943 is sold under the tradenames Alathon 3,170 and Gulf 7,002. In general, these copolymers will contain from about 7 to 21 percent by weight, preferably from about 10 to 18 percent, of vinyl acetate.

The fire retardant additive utilized in forming the flame retardant compositions of this invention is

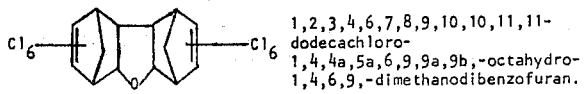

1,2,3,4,6,7,8,9,10,10,11,11-dodecachloro-1,4,4a,5a,6,9,9a,9b,-octahydro-1,4,6,9,-dimethanodibenzofuran.

This compound is currently sold under the trademark Dechlorane 602. For purposes of convenience, this compound will be referred to hereafter either under its trademark or as dibenzofuran. The amount of Dechlorane 602 employed for the present purposes will range from about 20.0 to 35 percent, based on the total weight of the composition.

It is also essential to incorporate an antimony compound into the formulation. Antimony trioxide is the preferred antimony compound, although many other antimony compounds may be utilized. Suitable inorganic antimony compounds include antimony sulfide, sodium antimonite, potassium antimonate, and the like. Many organic antimony compounds are also suitable, such as the antimony salts of organic acids and their pentavalent derivatives, disclosed in U.S. Pat. No. 2,996,528. Compounds of this class include antimony butyrate, antimony valerate, antimony caproate, antimony heptylate, antimony caprylate, antimony pelargonate, antimony caprate, antimony cinnamate, antimony anisate and their pentavalent dihalide derivatives.

The antimony additive will generally be employed in amounts ranging from about 5 to 20 percent, preferably 7 to 15 percent by weight, based on the total weight of the composition.

Another essential component of the polymer-based flame retardant composition is a polyfunctional monomeric cross-linking agent such as triallyl isocyanurate, triallyl cyanurate, trivinyl cyanurate, trivinyl citrate, and the like. The amount of this cross-linking agent may vary from about 0.1 to 5.0 percent, preferably from about 0.4 to 2.0 percent by weight, based on the total weight of the flame retardant composition. Although the exact function of this monomer in the compositions of this invention is not fully understood at this time some of the desired results achieved when utilizing the flame retardant compositions for extrusion coating of electrical wire or cable may be due to its presence.

It has also been found useful to employ conventional cross-linking agents such as organic peroxides. Typical organic peroxide free radical generators include dicumyl peroxide; 2,5-bis (tert.-butylperoxy) -2.5 diamethylhexane; di-t-butyl peroxide; benzoyl peroxide, lauroyl peroxide, stearoyl peroxide; and the like, as discussed in U.S. Pat. No. 3,287,312. The amount of organic peroxide, when employed, will range from about 0.5 to 5.0 by weight based on the total weight of the flame retardant composition.

Minor amounts of other additives may also be employed. Conventional antioxidants such as the polyquinolines and the like are often utilized in flame retardant polymeric compositions. Other ingredients that may be included are plasticizers, dyes, pigments, heat and light stabilizers, antistatic agents, and the like.

In accordance with another feature of this invention it has been found essential to employ a minor amount of an acid acceptor in the flame retardant compositions. Thus, for example, acid acceptors such as tetrabasic lead fumarate, magnesium oxide, calcium carbonate, and litharge, may be utilized. The amount of acid acceptor may range from about 0.5 to 2.0 percent by weight based on the total weight of the composition. One of the reasons for employing the acid acceptor is to avoid loss of peroxide during reaction. Furthermore, it has been found that for some reason the presence of the acid acceptor in the formulations, particularly those containing peroxides, assists in producing the desired flame retardant and other properties.

The Underwriters' Laboratories flammability test, designated as Subject 492, provides that a certical specimen of the finished coated wire or cable shall flame no longer than one minute following five 15-second applications of flame, the period between applications being 15 seconds. The specimen shall also not convey flame during, between, or after the five applications of flame.

The flame retardant polymeric compositions of this invention are particularly suitable as coatings for wire or cable used in nuclear power plants for radiation resistance, control cables, lead wires and the like. The polymeric compositions are mainly utilized as the insulation coating (30 to 70 mils) for the wire or cable. It may constitute the sole coating, but a secondary or outer coating such as polyvinyl chloride, chlorinated polyethylene, silicone, neoprene, polyvinylidene fluoride, and the like may also be utilized. The outer coatings will generally vary in thickness from about 15 to 30 mils.

The flame retardant compositions of this invention are prepared by conventional methods utilizing internal mixers, such as Banburys, continuous mixers, mixing extruders, and two-roll mills.

Conventional procedures and apparatus can also be employed in extruding the flame retardant compositions of this invention on to wires or cables.

The invention will be more fully understood by reference to the following specific embodiments which are not to be construed as limiting the scope of the invention but are only for purposes of illustration. Unless otherwise indicated, all of the amounts of ingredients are expressed in parts by weight.

EXAMPLE

The following formulations were prepared in an internal mixer and then extruded on to 19 strand 12 AWG wire. Representative formulations 1 through 4 were subjected to standard tests for comparison of flammability performances and physical properties.

TABLE A

| | \multicolumn{8}{c}{Formulations} |
|---|---|---|---|---|---|---|---|---|
| | 1 | 2 | 3 | 4 | 5 | 6 | 7 | 8 |
| Polymer | | | | | | | | |
| DYNH (LDPE) | 27.50 | 30.00 | 29.80 | 60.00 | 29.80 | 30.50 | 25.30 | 25.30 |
| Alathon 3170 (EVA) | — | — | 29.80 | — | 29.80 | 30.50 | — | — |
| Gulf 7002 (EVA) | 27.50 | 30.00 | — | — | — | — | 25.30 | 25.30 |
| Dechlorane 602 | 30.00 | 26.25 | 26.25 | 26.25 | 29.20 | 26.25 | 35.00 | 26.00 |
| Antimony Trioxide | 10.00 | 8.75 | 8.75 | 8.75 | 5.80 | 8.75 | 9.00 | 18.00 |
| Triallyl Isocyanurate | — | — | 0.40 | — | 0.40 | 2.00 | 0.40 | 0.40 |
| Dicumyl Peroxide | 3.00 | 3.00 | 3.00 | 3.00 | 3.00 | — | 3.00 | 3.00 |
| Antioxidant | | | | | | | | |
| Agerite Resin D* | 1.00 | 1.00 | 1.00 | 1.00 | 1.00 | — | 1.00 | 1.00 |
| Irganox** | — | — | — | — | — | 1.00 | — | — |
| Tetrabasic Lead Fumarate*** | 1.00 | 1.00 | 1.00 | 1.00 | 1.00 | 1.00 | 1.00 | 1.00 |

*Polymerized trimethyl dihydroquinoline
**Tetrakis methylene 3-(3',5'-di-t-butyl-4'-hydroxyphenyl) propinate methane
***Lectro 78

Plaques of formulations 1 through 4 were compression molded and various physical and electrical properties were determined as set forth in the following tables:

TABLE B

| | \multicolumn{4}{c}{Formulations} |
|---|---|---|---|---|
| Properties | 1 | 2 | 3 | 4 |
| Specific Gravity (gm/cc) | 1.25 | 1.19 | 1.23 | 1.20 |
| Oxygen Index (%) Flame Test (0.125 specimen thickness) | 28.50 | 27.70 | 28.00 | 26.40 |
| UL Subject 94 | *SE-0 | SE-0 | SE-0 | SE-1 |
| ASTM D-635 | SE | SE | SE | SE |

TABLE C

| Formulations* | \multicolumn{5}{c}{UL 492 Vertical Flame Test Down Time After Ignition Cycles, secs.} | Flag Condition |
|---|---|---|---|---|---|---|
| | 1/15 | 2/15 | 3/15 | 4/15 | 5/15 | |
| 1 | 0 | 0 | 0 | 0 | 0 | Uncharred |
| 2 | 0 | 0 | 0 | 0 | 0 | Uncharred |
| 3 | 0 | 0 | 0 | 0 | 0 | Uncharred |
| 4 | 0 | 0 | 3 | 15 | 72 | 13% Charred |

*Wall Thickness = 0.045

Further physical properties for Formulation 3 are enumerated below:

TABLE D

Vicat Softening Point — 78°C
Secant Modulus at 1% Strain — 11,600 psi
Tensile Strength — 2655 psi
Elongation — 550%
Shore A Hardness — 93
Heat Aging Data

| Test | Tensile Strength | Elongation |
|---|---|---|
| 7 days at 121°C | 2940 psi | 550% |
| 7 days at 136°C | 2840 psi | 560% |
| 7 days at 158°C | 3005 psi | 550% |

Water Absorption(24 hours at 25°C) — 0.02% Increase
Cold Impact
 −50°C — 5P/5
 −60°C — 2 Slightly Cracked/10
 −70°C — 4 Slightly Cracked/10

The above data show that the homopolymer and ethylene-vinyl acetate copolymer systems were superior to the straight homopolymer system. The former also exhibited outstanding electrical and physical properties.

While particular embodiments of the invention have been set forth above, it will be understood that the invention is obviously subject to modifications and variations without departing from its broader aspects.

What is claimed is:

1. A cross-linkable, flame retardant polymeric composition comprising the following ingredients:

| | | Weight % |
|---|---|---|
| (a) | polymer blend of approximately equal amounts of low density polyethylene plus ethylene-vinyl acetate copolymer | 50 to 75 |
| (b) | antimony compound | 5 to 20 |
| (c) | 1,2,3,4,6,7,8,9,10,10,11,11-dodeca-chloro-1,4,4a,5a,6,9,9a,9b-octahydro-1,4,6,9-dimethanodibenzofuran; | 20 to 35 |
| (d) | an acid acceptor selected from the group consisting of tetrabasic lead fumarate, magnesium oxide, calcium carbonate and litharge | 0.5 to 2.0 |
| (e) | a polyfunctional monomeric cross-lining agent selected from the group consisting of triallyl isocyanurate, triallyl cyanurate, trivinyl cyanurate and trivinyl citrate | 0.1 to 5.0. |

2. The cross-linkable, flame retardant polymeric composition of claim 1 wherein the ethylene-vinyl avetate copolymer contains from about 7 to 21 percent by weight of vinyl acetate.

3. The cross-linkable, flame retardant polymeric composition of claim 1 wherein the antimony compound is antimony trioxide.

4. The cross-linkable, flame retardant polymeric composition of claim 3 wherein the amount of antimony trioxide ranges from about 5 to 20 percent by weight.

5. The cross-linkable, flame retardant polymeric composition of claim 1 wherein the cross-linking agent is triallyl isocyanurate.

6. The cross-linkable, flame retardant polymeric composition of claim 1 wherein the cross-linking agent is a combination of triallyl isocyanurate and an organic peroxide compound.

7. The cross-linkable, flame retardant polymeric composition of claim 6 wherein the peroxide is dicumyl peroxide 8. The cross-linkable, flame retardant polymeric composition of claim 1 wherein the acid acceptor is tetrabasic lead fumarate.

9. A cross-linkable, flame retardant composition comprising the following ingredients:

| | | Weight % |
|---|---|---|
| (a) | polymeric component: blend of approximately equal amounts of low density polyethylene plus ethylene-vinyl acetate copolymer | 50 to 75 |
| (b) | Antimony trioxide | 5 to 20 |
| (c) | 1,2,3,4,6,7,8,9,10,10,11,11-dodeca-chloro-1,4,4a,5a,6,9,9a,9b-octahydro-1,4,6,9,-dimethanodibenzofuran | 20.0 to 35.0 |
| (d) | tetrabasic lead fumate | 0.5 to 2.0 |
| (e) | triallyl isocyanurate | 0.1 to 5.0. |

10. The cross-linkable, flame retardant composition of claim 9 containing from about 1.0 to 5.0 percent by weight of an organic peroxide cross-linking agent.

11. The cross-linkable, flame retardant composition of claim 9 wherein the ethylene-vinyl acetate copolymer comprises at least 20 percent by weight of the total polymeric component.

* * * * *